Oct. 7, 1924.   1,510,738
J. G. CAPSTAFF
METHOD OF PROTECTING FILMS AND LOADING SAME IN CAMERAS
Filed Oct. 1, 1923
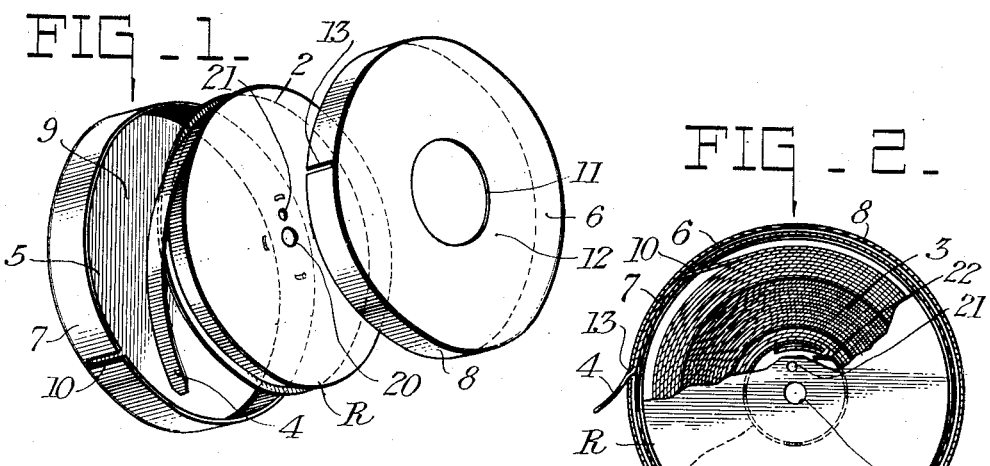
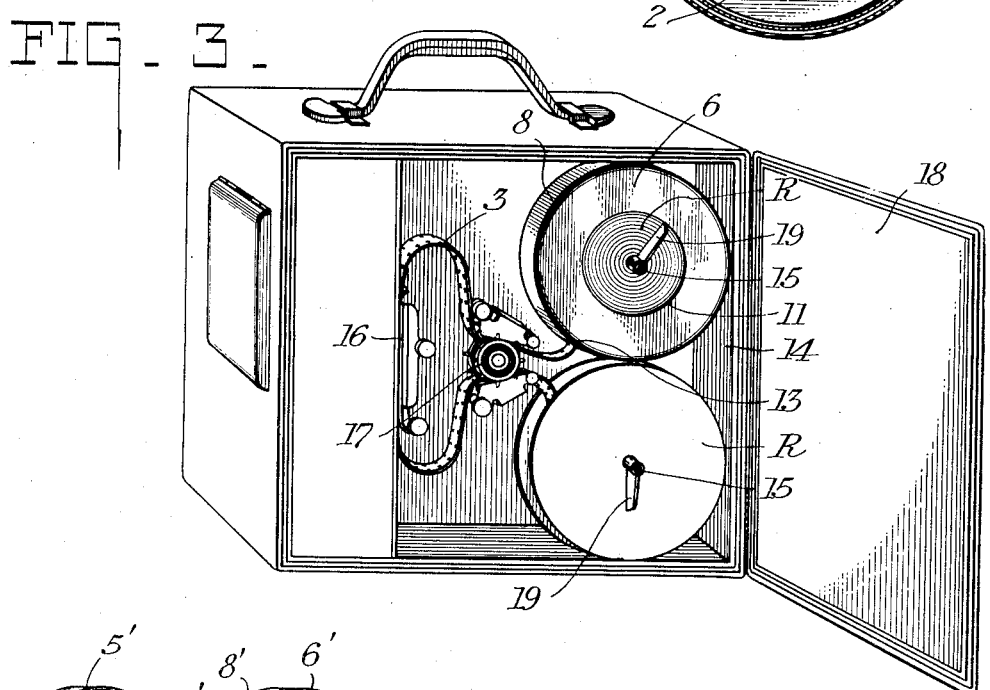
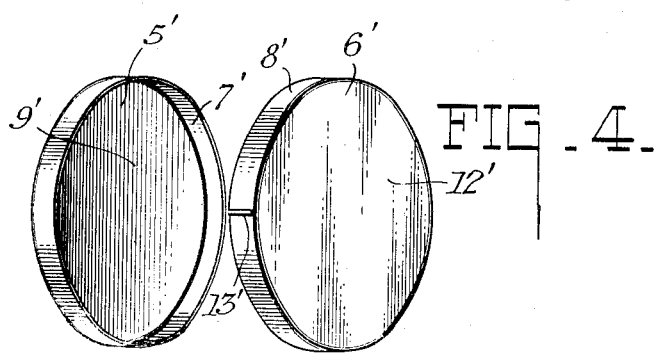
INVENTOR,
John G Capstaff,
BY
ATTORNEYS.

Patented Oct. 7, 1924.

1,510,738

UNITED STATES PATENT OFFICE.

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK.

METHOD OF PROTECTING FILMS AND LOADING SAME IN CAMERAS.

Application filed October 1, 1923. Serial No. 665,907.

*To all whom it may concern:*

Be it known that I, JOHN G. CAPSTAFF, a subject of the King of Great Britain, residing at Rochester, in the county of Monroe and State of New York, have invented certain new and useful Improvements in Methods of Protecting Films and Loading Same in Cameras, of which the following is a full, clear, and exact specification.

This invention relates to the loading and unloading of a reel of film in a camera, and is particularly directed to the avoidance of edge fog on a film used in a motion picture camera.

With small cameras adapted particularly for use by amateurs and using very narrow film, the danger of edge fog is especially great for several reasons. The users are not skilled and frequently not very careful; they usually have no facilities for loading in a dark room; the margin on each side of the picture area is necessarily very narrow and an amount of edge fog ordinarily permissible would extend materially into the picture area; there must be a certain tolerance in the manufacture of the reels and the cutting of the film, and shrinkage and expansion due to weather conditions must be allowed for. Moreover the rapidly moving mechanism used in advancing the film through the camera must be very light and permits of but little pull on the film due to binding or friction between the edges of the film and the reel flanges.

The methods which I use to overcome these difficulties will be apparent from the following specification, in which reference will be made to the accompanying drawings, in the several figures of which the same characters designate the same elements and in which—

Fig. 1 shows in perspective the reels of film and the parts of the magazine separated;

Fig. 2 is a section through the assembled reel of film and magazine;

Fig. 3 is a perspective view of a camera in which a reel of film is being loaded;

Fig. 4 shows in perspective the separate parts of a modified magazine.

I employ a reel comprising a hub or core 1 and flange 2 upon which is wound a film 3 having at each end a lead strip 4. I shall, however, designate the entire strip of material as a film, meaning thereby to include the lead strips whether made of the same material or of different pieces of material attached thereto. The sides or flanges have coaxial openings 20 and one side has a small eccentric opening 21; and the core has a slot 22 for engagement with a film end. The reel and film will be obtained by the user in a magazine comprising two caps 5 and 6 with telescoping flanges 7 and 8 overlapping by substantially the width of the reel. The outer cap 5 has an imperforate head 9 and may have a slot 10 in the flange. The inner cap 6 may have an axial opening 11, in its head 12 and has a slot 13 in its flange 8. The slots 10 and 13 are out of registry and a lead end 4 extends out through them, being tightly gripped by the flanges 7 and 8 between the slots.

The magazine, reel and film are sold by the manufacturer in the condition described. It is intended for use in a motion picture camera of the closed or box type in which the reels R are placed in the case of the camera and the film advanced from one to the other through the mechanism. This type is well known and only a general description of it is here needed. It comprises a case or box 14 within which are shafts 15 adapted to support the reels R, between which the film 3 is fed in the usual manner past the gate at 16 by suitable mechanism shown only in part at 17. The box is shown as having a single hinged door 18 rendering both reels simultaneously accessible. As shown in Fig. 3, the shafts have latches 19 holding the reels in place. At the take-up position is a lug, not shown, for engaging aperture 21.

The camera is first prepared for use by opening the door and placing one empty reel R in take-up position on lower shaft 15. The magazine with fresh film is brought, the outer cap 7 removed and laid aside, and the reel is at once placed in the camera with remaining cap 6 still in place, its head 12 being outermost and the flange 8 covering the edge of the reel. The aperture 11 is of sufficient size to permit the closing of latch 19, holding reel R in place but permitting the removal of cap 6. The slot 13 is so placed that the protruding lead end 4 of the film is readily threaded through the mechanism of the camera and attached to the reel in take-up position as by passing the tip through the slot 22 of the core 1. Fig. 3 shows the parts as they are at this stage. The cap 6 is now removed and the door 18 at once closed. The camera is operated in the usual way until the film, including the rear lead strip, is wound on the take-up reel. The camera door is then opened and cap 6 at once placed over the lower reel which is now filled with film. The cap 6 and reel are removed together from the camera and the outer cap 5 at once placed over them.

The lead strip alone affords a very large measure of protection, and when well fitting and used with care in a well shaded position usually affords complete protection; but it is frequently not a complete safeguard against edge fog when the film is exchanged in the bright sunlight, or if the user is not very careful, or if the edges of leaders do not quite contact the flanges. Magazines of various types have also been proposed but these have serious practical disadvantages in use, such as trouble with light traps, difficulties in rewinding, etc., if they are left in the camera. But by protecting the reel from the possibility of direct light reaching the edges of the film until the camera is completely loaded and prepared for operation, I obtain all the advantages of the light tight magazine with advantages in use in the camera of a simple reel. The magazine cap also prevents the accidental unwinding or loosening of the convolutions during threading.

Numerous modifications of the apparatus are possible. Besides almost illimitable possibilities of variations in the camera, there are numerous possible modifications in the mazagine and reel. For instance, if the camera does not have a protruding latch on the end of the reel shafts, both caps of the magazine may have imperforate heads. The slot in the flange of the outer cap is also not necessary. The parts of a magazine embodying these two changes are indicated in Fig. 4, where the outer cap 5' has an imperforate head 9' and continuous flange 7', while the inner cap 6' has an imperforate head 12' with a flange 8' slotted at 13'.

I contemplate as within the scope of my invention all such other equivalents and embodiments as fall within the scope of the appended claims.

Having thus described my invention, what I claim as new and desire to secure by Letters Patent is:

1. The method of protecting a long strip of film from edge fog that comprises the transportation of such film to the camera on a flanged reel in a closed magazine, the removal of a portion of the magazine leaving a portion thereof around the reel in a position to prevent direct light striking the edge of the film, and at once placing the reel and this portion in the camera, threading the film through the camera and then removing the remaining portion of the magazine and at once closing the camera.

2. The method of protecting a roll of film from light and of inserting it in a camera that comprises the transportation to the camera of such roll of film in a magazine comprising two caps with telescoping flanges, the inner flange being slotted, removing the outer cap and at once placing in feed position in the camera the roll in the remaining cap, drawing the lead end of the film through such slot and threading it operatively in the camera mechanism, removing the remaining cap and at once closing the camera.

3. The method of protecting from light a reel of narrow film particularly susceptible to edge fog and of inserting the same in a camera in the presence of light that comprises the transportation to the camera of such film on a flanged reel in a magazine comprising two caps with telescoping flanges overlapping by substantially the width of the reel, the inner flange being slotted, removing the outer cap and at once placing in supply position in the camera the reel of film with the remaining cap covering the same, drawing the lead end of the film through the slot and threading it operatively through the camera mechanism, removing the remaining cap and at once closing the camera.

4. The method of protecting a reel of film from light and of using it in a camera that comprises the transportation to the camera of such film on a flanged reel in a magazine comprising two caps with telescoping flanges, the inner flange being slotted, removing the outer cap and at once placing in supply position in the camera the reel of film with the remaining cap covering the same, drawing the lead end of the film through the slot, threading it operatively through the camera mechanism and attaching it to a similar reel in take-up position, removing the outer cap and at once closing the camera, operating the camera to wind the film completely from the first reel to the second reel, opening the camera and at once covering with a flanged cap the take-up reel then carrying the film, removing the take-up reel and cap from the camera and at once applying thereto a second cap telescoping with the first and forming therewith a magazine for the reel.

Signed at Rochester, New York, this 27th day of September, 1923.

JOHN G. CAPSTAFF.